United States Patent Office 3,373,340
Patented Mar. 12, 1968

3,373,340
VOLTAGE REGULATING SYSTEM FOR SYNCHRONOUS GENERATORS
Rudolf Dirr and Hermann Waldmann, Erlangen, Germany, assignors to Siemens Aktiengesellschaft, Munich, Germany, a corporation of Germany
Filed June 28, 1965, Ser. No. 467,203
Claims priority, application Germany, June 27, 1964, S 91,739
13 Claims. (Cl. 322—28)

ABSTRACT OF THE DISCLOSURE

A voltage reglating system for a self-excited synchronous generator comprises a bridge network of uncontrolled rectifiers. A transformer is connected to the network and supplies mutually superimposed base and load-responsive shares of current from the generator to the network. A comparator provides a control voltage dependent upon the departure of the generator voltage from a datum voltage. A controlled rectifier has a control circuit connected to the comparator and energized by the control voltage of the comparator to be phase controlled by the departure of the generator voltage from the datum voltage. The anode of the controlled rectifier is connected to the secondary phase of the transformer via a resistor. The cathode of the controlled rectifier is connected to the negative pole of the bridge network.

---

Our invention relates to a voltage regulating system for synchronous generators equipped with a self-excitation circuit containing rectifier diodes.

Compound-excited synchronous generators have the advantage of automatically adapting the excitation current to the instantaneous load, so that no separate regulation is required. The resulting degree of constancy of the generated voltage is satisfactory for many purposes. Hence, such self-excited synchronous generators are also called "constant-voltage generators."

For more exacting requirements as to voltage constancy, particularly with relatively large generators, and also for operating several generators in parallel or on a single power distribution line, it has become known to provide for regulation in addition to the inherent compounding effect. According to one of the regulating systems, the excitation of the generator is overcompounded so that the resulting voltage is slightly increased above the rated value, and the added regulator passes the corresponding excess of excitation current through a controllable shunt circuit.

It is an object of my invention to devise a greatly simplified regulating system capable of performing a precise regulation of the synchronous-generator voltage at increased operational reliability.

According to the invention, a system for voltage regulation of synchronous generators self-excited through a non-controlled excitation rectifier by excitation current having a base component and a load-responsive component, has this excitation rectifier constituted by a bridge network, and is provided with a voltage-regulating comparator to furnish a control voltage which is dependent upon the departure of the generator voltage from a datum value and acts upon a controllable rectifier whose cathode is connected directly to the minus pole of the excitation rectifier and whose anode is connected through a resistor to a secondary phase of a transformer furnishing the excitation current to the bridge network.

Suitable for the purposes of the invention are mainly silicon controlled rectifiers (silicon thyristors) to operate as the controlled member which provides the controlled variable in the regulating system.

According to one embodiment of the invention, such a thyristor is fired by a firing circuit comprising a double-base diode which, when triggered, passes discharge current from a capacitor to the thyristor to fire the latter, the triggering being done under control by the output voltage of the comparator.

Figure 1:
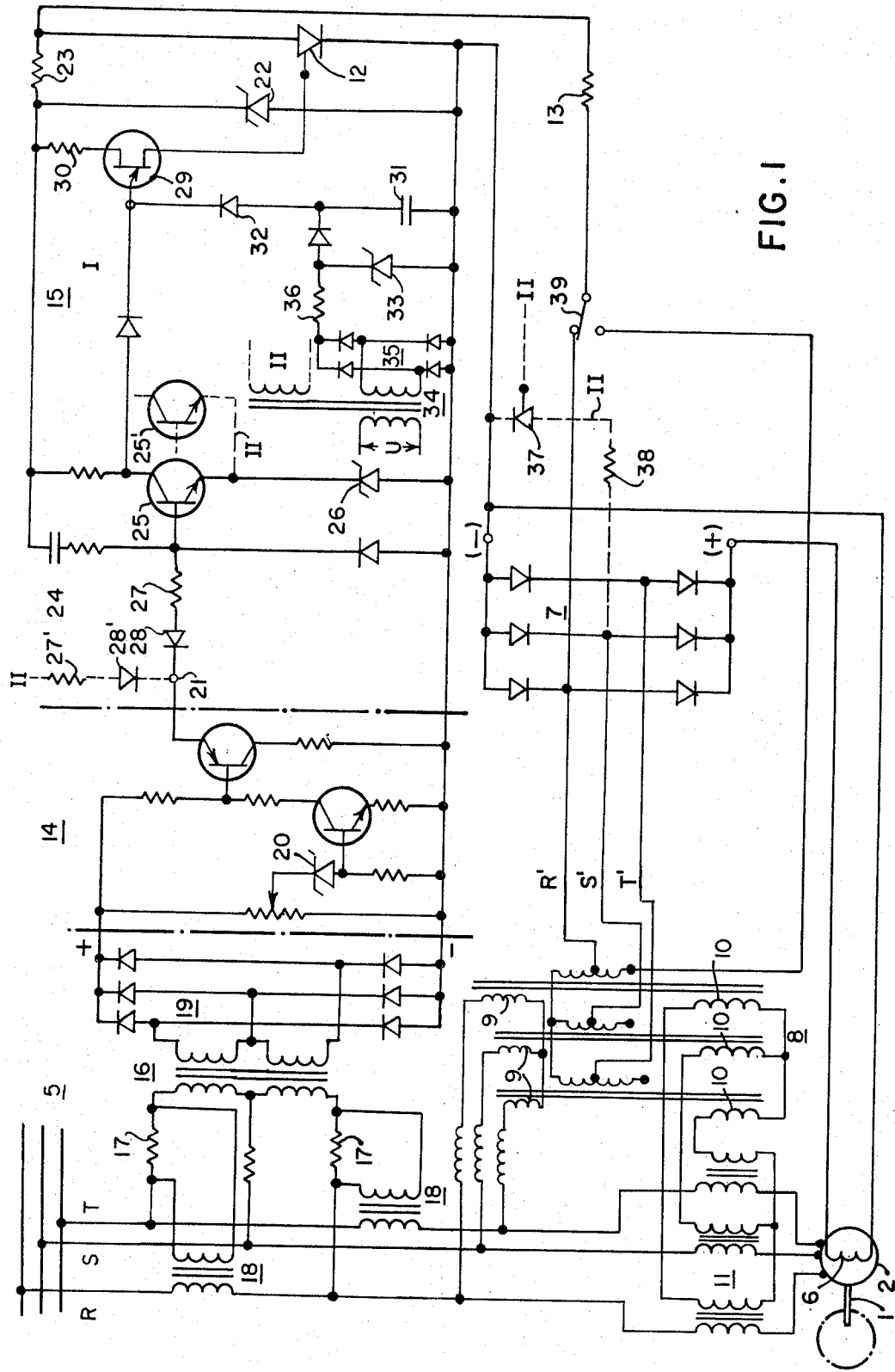
Figure 2:
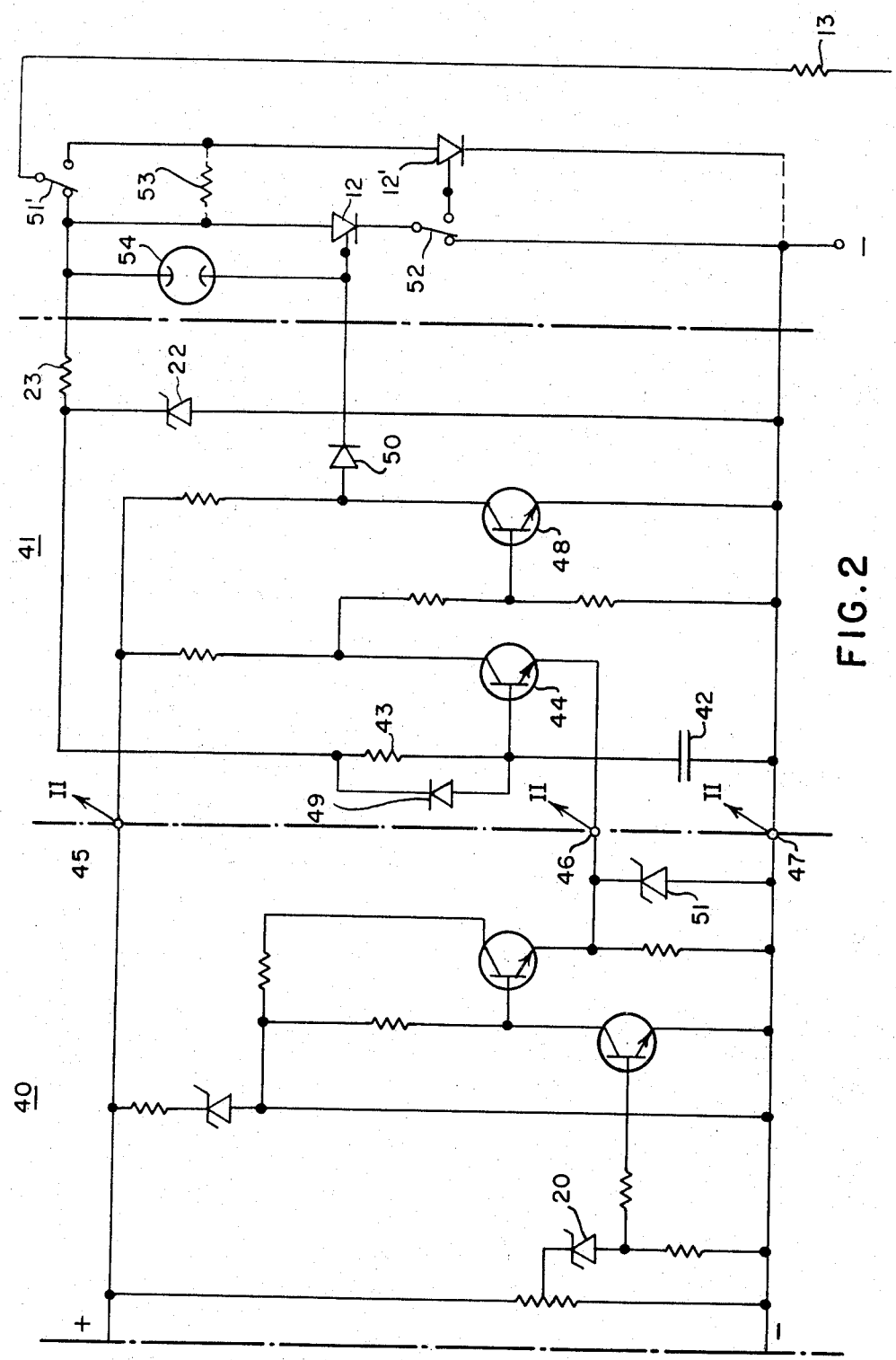

The foregoing and more specific objects, advantages and features of our invention, said features being set forth with particularly in the claims annexed hereto, will be apparent from, and will be described in, the following with reference to the embodiments of synchronous-generator regulating systems illustrated by way of example in the accompanying drawings, in which:

FIG. 1 is a schematic circuit diagram of a first embodiment of the voltage regulating system of the present invention; and FIG. 2 is a schematic circuit diagram of a modification of the embodiment of FIG. 1.

According to FIG. 1, a prime-mover shaft 1 drives a three-phase generator 2 supplying power through buses R, S and T to a main bus 5, to which additional three-phase generators may be connected. The generator pole wheel 6 is excited by direct current from an excitation rectifier formed by a three-phase bridge network 7 of non-controlled rectifier units such as diodes. The diode network 7 is energized from the three phases R', S' and T' of a transformer 8 to having two primary windings 9, 10. The winding 9 furnishes in known manner a component current dependent only upon the phase voltage, to produce the so-called base component of excitation. The second primary winding 10 is energized from a current transformer 11 connected in the three-phase buses and provides a load-dependent component of excitation current. The superposition of both components of excitation current is effected in the secondary winding of the rectifier transformer 8. This secondary winding is rated to deliver a voltage slightly higher than the rated value, this manner of rating being called "overcompounding." It is the purpose of the additional regulation to withdraw the resulting excess of excitation current by diverting it through a shunt circuit parallel to the pole wheel winding 6 in such a controllable manner that the generator output voltage is accurately maintained at the desirèd rated or datum voltage.

For this purpose, and according to the invention, a controllable rectifier 12, such as a thyristor, and a resistor 13, are connected in series with each other between a secondary phase of the rectifier transformer 8 and the negative pole of the excitation rectifier network 7. When the thyristor 12, preferably a silicon controlled rectifier, is turned on, it passes current from the transformer 8 through a shunt path extending from the phase R' to the phase T' or S' through one of the respective diodes in the bridge network 7. Consequently, by varying the phase position of the firing moment for thyristor 12 in the sense of delayed commutation control, more or less current, otherwise flowing from transformer 8 exclusively through rectifier 7 and through the excitation winding 6 of the generator pole wheel, is diverted from the excitation winding 6.

Since the voltage impressed upon the shunt circuit through the thyristor 12 need not be dependent upon the feeder voltage applied to the excitation rectifier network 7, the resistor 13 on the anode side of the thyristor 12 need not be connected to the same secondary voltage of the rectifier transformer 8 as the network 7. It is in some cases preferable for dimensioning or matching reasons to connect the resistor 13 to a higher or lower voltage than the rectifier network 7. Accordingly, the system illustrated in FIG. 1 is shown equipped with a selector switch 39 which permits connecting the shunt circuit of thyristor 12 and resistor 13, at the anode side of this circuit, either to the phase R′ or to a separate tap of a secondary phase in transformer 8.

It will be understood, of course, that the rectifier feeder transformer 8 is a three-phase transformer. For example, each of its primary windings 9 and 10 may comprise three individual phase windings in delta connection energized from the three-phase buses R, S, T symbolized by the line 4; and the secondary winding of transformer 8 may have three Y-connected phase windings of which one has a tap exclusively for connection to the shunt circuit of thyristor 12.

Accurate constancy of the voltage at the main bus 5 is maintained by means of an additional voltage regulator 14 which is essentially a comparator whose output voltage controls the firing of the thyristor 12 through a firing network 15. A pilot voltage proportional to the actual phase voltage of bus 5 is supplied through a transformer 16 in so-called V-connection (double-Y connection). Connected in the primary circuit of transformer 16 are the load resistors 17 of two current transformers 18 inductively coupled with the respective phase buses R and T. These current transformers superimpose upon the actual or pilot voltage a voltage share dependent upon the reactive load, such superposition being known as such. The resulting "falsification" of the composite pilot voltage produces a static influence, manifested by a decrease in generator voltage with increasing reactive load, as is indispensable particularly when several synchronous generators operate in parallel. Consequently, at the direct-current output terminals of a rectifier bridge network 19 connected to the transformer 16, there occurs a voltage generally proportional to the phase voltage of the generator 2 but increased by a share which depends upon the reactive load and provides for the above-mentioned static modification.

The output voltage of the bridge network 19 is supplied as pilot voltage to the input terminals of the voltage regulator or comparator 14 where it is compared with a datum voltage constituted by the breakdown voltage of a Zener diode 20. The output terminal 21 of the comparator 14 thus furnishes a direct voltage which depends upon the magnitude of the regulating error and which is amplified by two transistors in the comparator 14 to serve as a control voltage for determining the firing moment of the thyristor 12.

The feed voltage for the firing network 15 is derived from the operating voltage of the thyristor 12. To this end, a Zener diode 22 is connected in series with a resistor 23 and in antiparallel relation to the thyristor 12. The thyristor 12 fires during each second half-wave of the alternating feeder voltage when this voltage biases the thyristor 12 in the forward direction. Up to the firing moment, a voltage limited to a constant value is impressed upon the Zener diode 22 and serves as a feeder voltage and simultaneously as synchronizing voltage for the firing network 15.

The charging current of a time-delay capacitor 24 determines the firing angle (phase position of the firing moment) for the thyristor 12 in such a manner that an increase in output voltage from regulator 14 at terminal 21 decreases the firing angle and vice versa. This is due to the fact that the emitter of the transistor 25 is fixed to a constant potential by means of a Zener diode 26. Thus a constant current will flow through resistor 27 and diode 28, whereas the control current of transistor 25 flowing through the emitter varies, since it is always formed by the difference between the charging current of capacitor 24 and the constant current through resistor 27.

The charging current of capacitor 24 decays in accordance with an exponential function whose characteristic values are given by the time constant of the charging circuit and by the constant difference between the respective breakdown voltages of Zener diodes 22 and 26. A decrease of the controlling direct voltage at terminal 21 causes an increase of the adjusted constant current flowing through the resistor 27, and results in earlier occurrence of the moment when the control current of transistor 25 declines to zero. At this moment, the collector potential of transistor 25 increases due to blocking of its base-emitter path, and this causes the emitter-base path of the double-base diode 29 to be switched on, thus initiating the firing of the thyristor 12.

A double-base diode, also called unijunction diode or unipolar transistor, has the property of becoming fully conducting when a given control of breakdown voltage is applied, thus operating in the manner of a closed mechanical switch contact. The magnitude of the triggering voltage is dependent upon the magnitude of a base resistance, namely the resistor 30 in the system exemplified by FIG. 1.

After the double-base diode 29 has switched through, a capacitor 31 is short-circuited through a decoupling diode 32, the base-emitter path of the double-base diode 29 and the firing path of the thyristor 12, thus furnishing the current required for firing the thyristor 12. To make certain that the double-base diode 29 is turned on exclusively by the collector voltage of the transistor 25 but not by the voltage of capacitor 31, the capacitor is charged from a voltage which is limited by means of a Zener diode 33 to a value below the trigger voltage of the diode 29. As shown in FIG. 1, this limited charging voltage for capacitor 31 may be obtained from an alternating voltage connected to the Zener diode 33 through a transformer 34, a two-way rectifier network 35 and a resistor 36. In principle, the magnitude and phase position of this voltage U are not essential, as long as it has the same frequency as the phase voltage of the synchronous generator 2.

Instead of charging the capacitor 31 with the aid of an auxiliary voltage U, it may also be charged from the feeder voltage of the firing network 15. For this purpose the capacitor 31 may be connected through a resistor to the connecting lead between resistor 23 and Zener diode 22. In this case, too, the charging voltage of the capacitor 31 must be limited, for example by a Zener diode, to a value below the critical switch-on voltage of the double-base diode 29 so that the capacitor 31, while being capable of furnishing firing current, cannot cause triggering of the double-base diode 29.

The modified embodiment illustrated in FIG. 2 affords a particularly simple design of the regulating system. Shown in FIG. 2 are only the comparator or auxiliary regulator portion 40 (corresponding to 14 in FIG. 1) and the firing circuit 41 (corresponding to 15 in FIG. 1), the system being otherwise as shown in FIG. 1 and described above.

In the system of FIG. 2, like in the system described with reference to FIG. 1, the synchronizing voltage for the firing circuit is derived from the breakdown voltage of the Zener diode 22 connected in series with a resistor 23 in antiparallel relation to the thyristor 12, such as a silicon controlled rectifier, to be fired. It will be understood that the voltage regulator or comparator 40 is connected to the output terminals of a rectifier 19 according to FIG. 1 whose terminal leads are denoted by "+" and "—" in both illustrations. The thyristor 12 according to FIG. 2 has its cathode connected with the negative output pole of the excitation rectifier 7 shown in FIG. 1.

In the input stage of the voltage-regulating comparator 40, the pilot voltage furnished from rectifier 19 is compared with the datum value represented by the breakdown voltage of the Zener diode 20. The resulting regulating error controls an amplifier composed of two sequential transistor stages to produce between the output terminals 46 and 47 of the regulator 40 an amplified voltage inversely proportional to the regulating error.

The firing circuit 41 comprises an RC-member composed of a resistor 43 and a capacitor 42. The RC-member is charged each time at the beginning of a half wave of feeder voltage poled in the forward direction of the thyristor 12. The charging voltage of capacitor 42 is impressed upon the input circuit of a transistor 44 in series opposition to a voltage proportional to the regulating error. The time constant of the RC-member is so rated that the charging voltage of the capacitor increases approximately in linear proportion to time. When this charging voltage exceeds the voltage between the terminals 46 and 47, the transistor 44 is turned on and then causes the next following transistor 48 to be turned off. This increases the collector potential of the transistor 48 and thereby fires the thyristor 12.

Such firing occurs each time within the period of a half-wave of feeder voltage in the forward direction of the thyristor 12 and takes place at an earlier phase moment when the regulating error is large rather than when the error is small.

After firing of the thyristor 12, the capacitor 42 discharges through a diode 49 shunted across the resistor 43, and through a resistor 23 and the then conducting thyristor 12. The resistance values of resistors 43 and 23 differ from each other by about one order of magnitude, so that discharging of the capacitor 42 requires considerably less time than charging the capacitor. This assures that the capacitor 42 is virtually charged completely each time the feeder voltage changes its polarity to that corresponding to the forward direction of the thyristor.

The firing circuit 41 further comprises a threshold diode 50 which prevents the transistor 48, when turned on, from inadvertently firing the thyristor 12. For protecting the base-emitter path of transistor 44 from excessively high blocking voltages, it is in some cases advisable to connect a Zener diode 51 across the two output terminals 46 and 47 of the voltage-regulating comparator 40, this being the case in the embodiment shown in FIG. 2.

If the thyristor-controlled shunt circuit in a system according to the invention requires a greater magnitude of current than can be controlled by a single thyristor, additional thyristors may be added and controlled in an analogous manner. Thus, FIG. 2 shows an additional thyristor 12' rated for a higher current-carrying and controlling capacity than the thyristor 12. The system permits selectively operating the thyristor 12' instead of the thyristor 12 and employing in the latter case the thyristor 12 for the purpose of supplying firing current to the larger thyristor 12'. For this purpose the system comprises suitable selector switches 51' and 52. For operating the thyristor 12' the switches are placed in the positions shown by broken lines, a resistor 53 is to be connected or switched into the circuit, the cathode of thyristor 12' being then connected with the negative pole of the rectifier network 7 (FIG. 1). All of these connections are preferably made selectively with the aid of switch means, such as by operating a single relay or contactor which comprises the switches schematically shown at 51' and 52. The regulating performance of the system takes place in analogy to the one already described. Upon firing of the thyristor 12, the anode current of this thyristor flows through the firing path of the thyristor 12' to fire the latter.

With constant-voltage generators, particular attention must be given to the conditions obtaining in the event of a short-circuit. In this case, the excitation of the generator should be reduced as rapidly as possible. Inherently, however, the constant-voltage generator tends to do just the opposite, because an increasing short-circuit current increases the output voltage of the excitation rectifier and consequently also the excitation current of the generator. Since, due to the short-circuit, the voltage of the generator breaks down simultaneously, the voltage-regulating comparator (14, 40) cannot cope with such an undesired increase in excitation current. According to another feature of our invention, however, this case can be taken into account by providing the anode-emitter path of the controllable rectifier or thyristor 12 with a parallel-connected member responsive to overvoltage, preferably a spark gap 54 as shown in FIG. 2. In the event of an excessively high increase in excitation voltage due to short-circuit of the generator voltage, the spark gap or equivalent protective member will break down and cause firing of the thyristor 12. In this manner, an undesired increase of excitation current is effectively avoided even under short-circuit conditions.

In cases where a single-phase thyristor system would not suffice to control the excitation current, our invention readily permits adapting the system to double or multiphase operation. This is indicated by II in FIGS. 1 and 2. It is only necessary to connect a further controllable rectifier or thyristor, such as the one shown at 37 in FIG. 1, through an anode resistor 38 between the secondary terminal of the transformer 8 and the negative pole of the excitation rectifier network 7. The control of the thyristor 37 is then effected by a separate firing circuit which is likewise controlled from the voltage-regulating comparator 14 analogously to the above-described control of the thyristor 12. Consequently, any regulating error, manifested by a corresponding direct voltage, is applied to a firing circuit corresponding to the one denoted by 15 in FIG. 1. The amplified error voltage passes from terminal 21 through the diode 28' and a resistor 27' to the second firing circuit. Connected to the cathode of the Zener diode 26 is the emitter of the transistor 25' in the second firing circuit (not further shown) assigned to the thyristor 37. The system of FIG. 1 thus enlarged for two-phase operation otherwise functions in the manner explained above.

If the modified circuitry according to FIG. 2 is employed, the second firing circuit for the second thyristor is to be energized analogously from the output terminals 45, 47 of the voltage-regulating comparator 40.

It will be understood that instead of increasing the current-carrying capacity of the thyristor-controlled shunt circuit by plural-phase operation, it also suffices in some cases to employ single phase systems and to simply connect a second or additional thyristor for load sharing in parallel relation, their respective anodes being connected to the same phase of the transformer 8.

To those skilled in the art it will be obvious upon a study of this disclosure that our invention permits of various modifications with respect to circuitry and components, and may be given embodiments other than particularly illustrated and described herein, without departing from the essential features of our invention and within the scope of the claims annexed hereto.

We claim:

1. A voltage regulating system for self-excited synchronous generators, comprising a generator excitation circuit, a bridge network of uncontrolled rectifiers having direct-current positive and negative poles to which said excitation circuit is connected, alternating-current means having a transformer connected to said network for supplying mutually superimposed base and load-responsive shares of current from the generator to said network, comparator means for providing a control voltage dependent upon the departure of the generator voltage from a datum voltage, a controlled rectifier having a control circuit connected to said comparator means and energized by the control voltage thereof to be phase controlled by said departure of the generator voltage from said datum voltage, said transformer having a secondary phase, a resistor through which said controlled rectifier has its anode connected to said transformer secondary phase, said controlled rectifier having its cathode connected with said negative pole of said network.

2. A voltage regulating system for self-excited synchronous generators, comprising a synchronous generator having output buses and an excitation circuit, a bridge network of rectifier diodes having direct-current positive and negative poles to which said excitation circuit is connected, alternating-current means having a rectifier feeder transformer primarily connected to said buses and secondarily connected to said rectifier network for supplying mutually superimposed base and load-responsive shares of current from the generator to said network, comparator means for providing a control voltage dependent upon the departure of the generator voltage from a datum voltage, a thyristor having a firing circuit connected to said comparator means and energized by the control voltage thereof to be phase controlled by said departure of the generator voltage from said datum voltage, said thyristor having an anode and a cathode connected with the secondary side of said transformer and with said negative pole respectively, and resistor means serially connected between said anode and said transformer.

3. In a synchronous generator voltage regulating system according to claim 1, said controlled rectifier being a silicon thyristor.

4. In a synchronous generator voltage regulating system according to claim 3, said transformer having a secondary winding with a tap assigned only to said thyristor, said anode being connected with said tap so as to have the same voltage as said tap.

5. In a synchronous generator voltage regulating system according to claim 2, said firing circuit comprising a double-base diode and a capacitor connected to said latter diode to be discharged under control by said diode for furnishing firing current to said thyristor, and feed voltage means for said diode and capacitor, said feed voltage means comprising a resistor and a Zener diode serially connected with said resistor in antiparallel relation to said thyristor.

6. A synchronous generator voltage regulating system according to claim 5, comprising a transistor having a collector resistor connected to said double-base diode to apply trigger voltage thereto, said transistor having an emitter and a base, fixed potential means connected to said emitter, a resistor connected between said base and said comparator means in a manner whereby the control voltage of said comparator means is applied to said resistor, and an RC-member connecting said base with the positive pole of said feed voltage means so that the control current of said transistor depends upon the charging current of said RC-member.

7. In a synchronous generator voltage regulating system according to claim 5, said feed voltage means comprising auxiliary alternating voltage supply means having the frequency of the generator voltage, a two-way rectifier connected to said auxiliary supply means and having direct-voltage output leads between which said Zener diode and said resistor are serially connected.

8. In a synchronous generator voltage regulating system according to claim 2, said firing circuit comprising a control transistor having a main circuit connected to said thyristor for firing the latter and having an emitter-base circuit for controlling the firing moments, and an RC-member connected with said base circuit and having a capacitor charging voltage connected in said emitter base circuit in series opposed relation to the control voltage from said comparator means.

9. A synchronous generator voltage regulating system according to claim 8, comprising a resistor and a Zener diode serially connected with said resistor in antiparallel relation to said thyristor, said RC-member being connected across said Zener diode to receive constant voltage therefrom.

10. A synchronous generator voltage regulating system according to claim 2, comprising a second thyristor interposed between the aforesaid thyristor and said firing circuit so as to be fired by said firing circuit, said second thyristor having an anode circuit connected to the firing path of the aforesaid thyristor to supply firing current thereto.

11. A synchronous generator voltage regulating system according to claim 2, comprising an overvoltage-responsive member connected parallel to the anode-gate path of said thyristor and being conductive only upon occurrence of excessive voltage across said path.

12. A voltage regulating system for self-excited synchronous generators, comprising a generator excitation circuit, a rectifier bridge network of diodes having direct-current positive and negative poles to which said excitation circuit is connected, alternating-current means having a transformer connected to said network for supplying mutually superimposed base and load-responsive components of current from the generator to said network, comparator means for providing a control voltage dependent upon the departure of the generator voltage from a datum voltage, a plurality of thyristors having respective firing networks connected to said comparator means and energized by the control voltage thereof to be phase controlled by said departure of the generator voltage from said datum voltage, said transformer having secondary winding means, resistor means through which said respective thyristors have their anodes connected to said secondary winding means, said controlled rectifiers having their respective cathodes connected with said negative pole of said rectifier network.

13. In a synchronous generator voltage regulating system according to claim 12, said secondary winding means of said transformer having different phases, and said respective thyristor anodes being connected to different ones of said phases.

References Cited

UNITED STATES PATENTS

| 3,254,293 | 5/1966 | Steinbruegge et al. | 322—25 X |
| 3,302,097 | 1/1967 | Bobo et al. | 322—25 |
| 3,323,036 | 5/1967 | Runyan | 322—32 X |

JOHN F. COUCH, *Primary Examiner.*

H. HUBERFELD, *Assistant Examiner.*